UNITED STATES PATENT OFFICE.

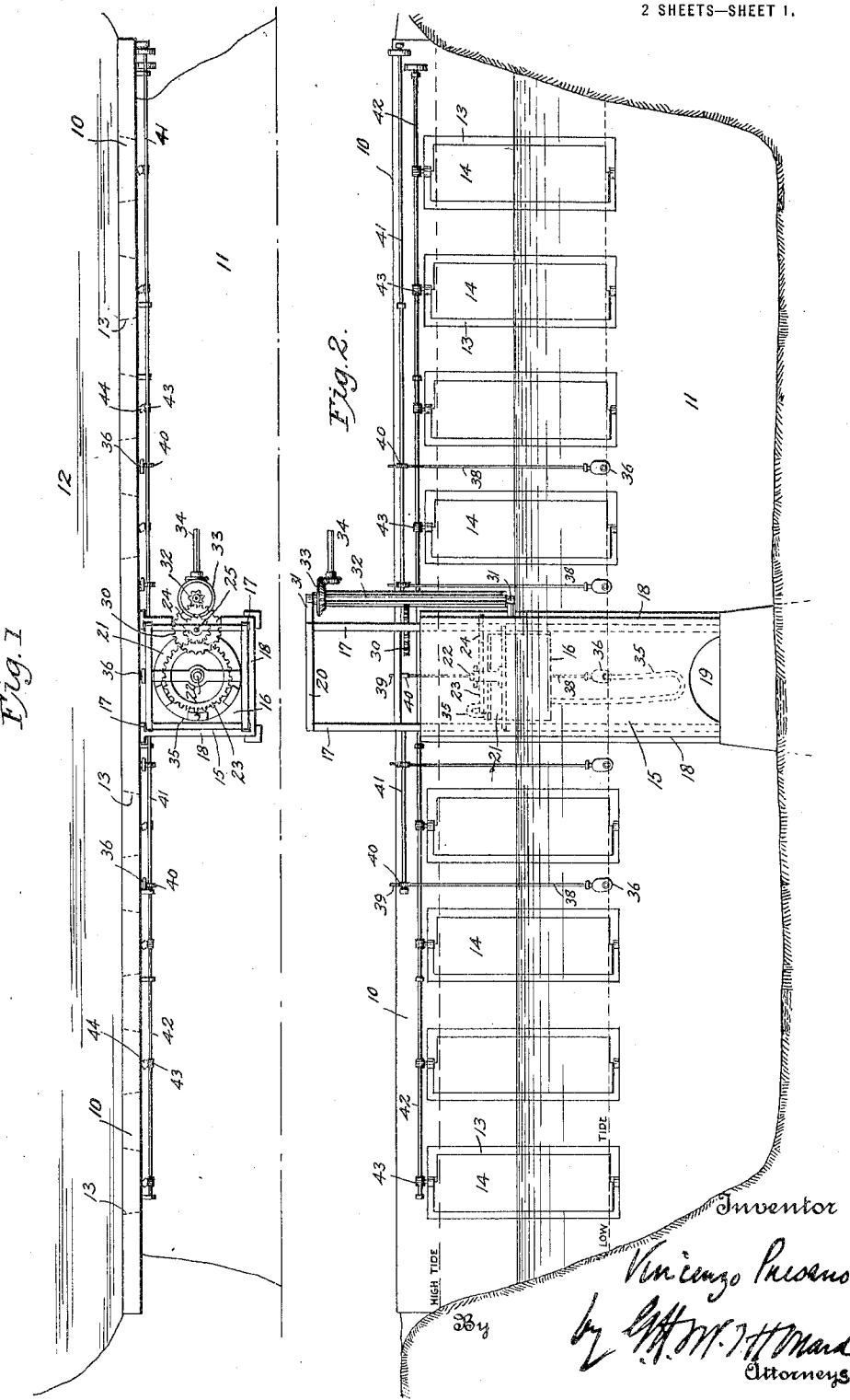

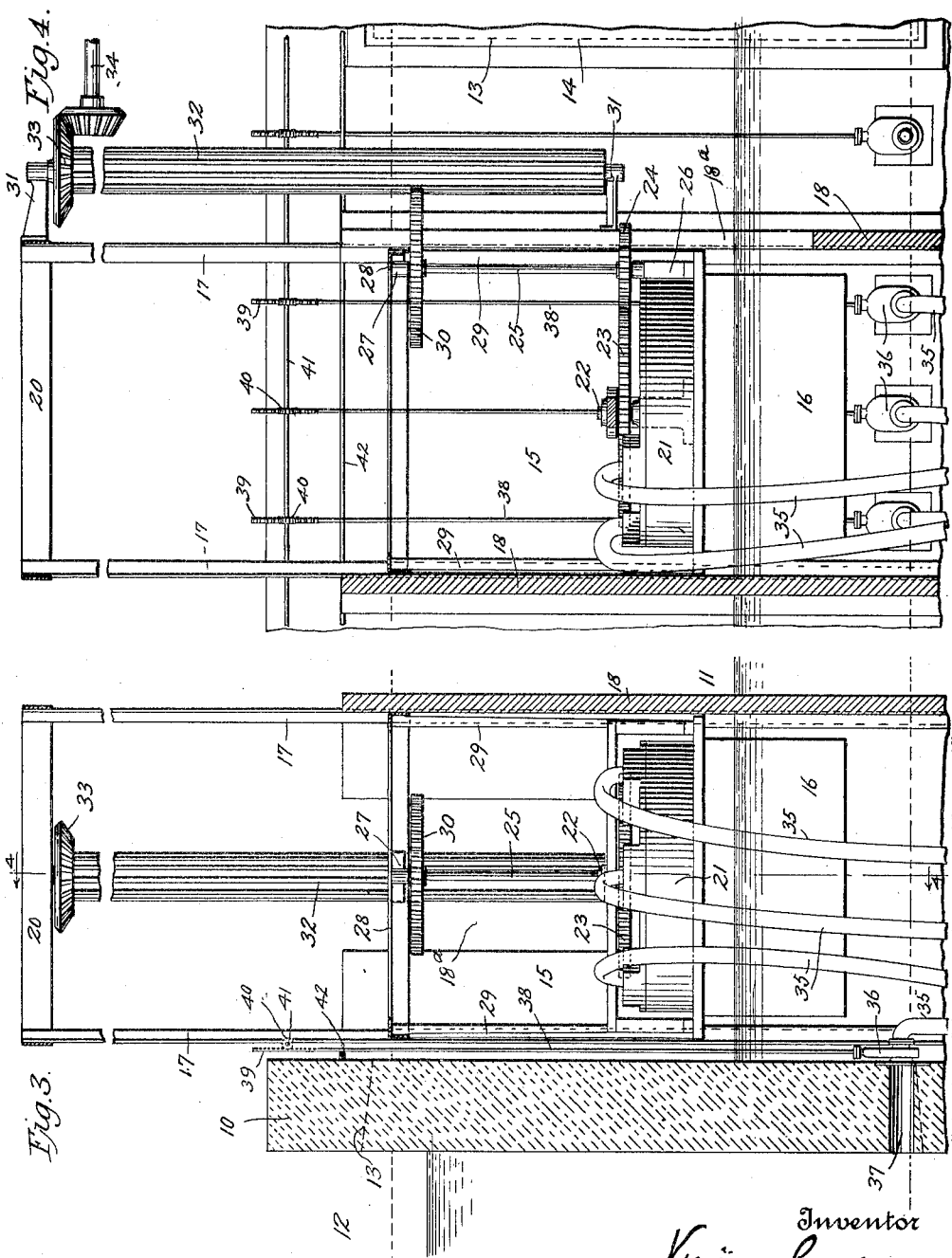

VINCENZO PAESANO, OF ISOLA SIRI SUPERIORE, ITALY, ASSIGNOR OF ONE-HALF TO P. DI MILLA, OF BOSTON, MASSACHUSETTS.

SYSTEM FOR DEVELOPING POWER BY TIDAL MOVEMENT.

1,348,313.     Specification of Letters Patent.     Patented Aug. 3, 1920.

Application filed December 20, 1919. Serial No. 346,274.

*To all whom it may concern:*

Be it known that I, VINCENZO PAESANO, a subject of the King of Italy, residing at Isola Siri Superiore, Province of Coserta, Italy, have invented new and useful Improvements in Systems for Developing Power by Tidal Movement, of which the following is a specification.

This invention relates to a system for developing power by tidal movement of the ocean or other waters, through the construction of a suitable reservoir or reservoirs on or near the shore of an ocean, sea, bay or inlet subject to ebb and flow of tides, into which reservoir, or reservoirs, through suitable inlet gates or valves, water shall flow naturally while the tide rises, and when the flood point has been reached shall close to hold the water as the tide falls. The water thus retained or stored is distributed through suitable conduits or trunk lines to one or more fluid motors mounted on a float or floats which rise and fall with the tide, preferably in one, or a plurality of, box-like receptacles or wells erected close to the retaining wall or dam of the reservoir.

The object of the invention is to provide a simple, relatively inexpensive and efficient system for utilizing the power of the tides and availing of the employment of such power by converting it into motion whereby to drive machinery of all kinds, for the production of electricity, or for other general uses.

When practicable, the reservoirs for each plant are made of capacity sufficient to hold a quantity of water capable of driving certain fluid motors continuously during the ebb of the tide, or at times between ebb and flow when the inlet gates are closed.

With the above as the primary purpose in view, and other objects hereinafter to be set forth, the invention consists of the novel construction, combination and arrangement of parts now to be described, and as illustrated in the accompanying drawings, in which—

Figure 1 is a diagrammatic plan view of a plant constructed in accordance with my invention. Fig. 2 is a diagrammatic elevation of the same as viewed from the body of water to be utilized. Fig. 3 is a vertical cross section through the retaining wall of a reservoir and the well containing the float and fluid motor. Fig. 4 is a vertical cross section of the float well on the line 4—4 of Fig. 3.

In the drawings, 10 is a retaining wall or dam built across the head of a depression 11 of the shore of the ocean, or an inlet therefrom to which the tides have access, the wall or dam forming a reservoir 12 into which water flows, as the tide rises, through suitable openings 13 in the wall of the dam, said openings being guarded by gates or valves 14 to prevent back or outflow of water during ebb tide.

The wall or dam 10 has built against its outer or ocean side one or more box-like receptacles or wells 15, within each of which is a float 16 adapted to rise and fall with the movement of the tide. For simplicity of illustration and description, but one well and one float are shown. The well 15 as represented is rectangular in cross section, but it may be circular or of other form, and when rectangular comprises four vertical corner members 17 which may be made of angle metal, as shown, or of concrete or other suitable material. The well optionally is placed against the outer face of the dam 10 which forms one side of the well, the other sides preferably being closed as at 18 to any desired height, say two or three feet above the level of high tide. Below the level of low tide, openings are made in the sides 18 of the well to permit free entrance into the well of the rising and falling water in the inlet 11. One of these openings, 19, is shown in Fig. 2 and the other sides 18 of the well are provided with like openings. The upper ends of the posts 17 are connected by cross bars 20 as shown.

Secured to the float 16, and movable vertically therewith, is a fluid motor 21 of any approved type, as of the turbine type, mounted to revolve in a horizontal plane. On the shaft 22 of the turbine is keyed a spur gear wheel 23 which meshes with a second gear wheel 24 keyed at the lower end of a vertical shaft 25 extending above the float and turning in bearings 26 and 27. The former is affixed to the float on one side thereof, the latter being carried on a cross bar 28 supported by corner posts 29 rising from the float. A gear wheel 30 is secured on the upper end of the shaft 25 to rotate therewith and rise and fall with the float 16. The gear wheel 30 extends outwardly beyond the float and through a vertically elongated opening 18ª in the adjacent side 18 of the well. Supported in a vertical position by bearings 31 projecting outwardly from the side of the well 15 provided with the opening 18ª, is an elongated pinion 32 with which the gear wheel 30 constantly engages. The length of the pinion 32 is equal to the distance traveled by the float 16, in order that the gear 30 may continue in operative engagement with the pinion whatever may be the vertical position of the float. To the upper end of the pinion 32 may be fastened a bevel gear wheel 33 or other means for driving a power shaft 34.

To the turbine 21, which may be of any approved commercial type, water is delivered through one or more openings in the upper side of the turbine casing by a flexible pipe 35 connected at one end to said openings, and at its other end to a valve 36 attached to the dam 10 at or near the low tide level, and controlling the flow of water through the outlet openings 37 formed through the dam. The valves 36, shown as vertically slidable gate valves, are operated by upright stems 38 extending to the top of the dam 10, they being each provided with a rack 39 on its upper end to be engaged by a pinion 40, the several pinions being carried on a horizontal shaft 41, rotatable to open the valves by hand or power.

The inlet openings 13 made in the retaining wall 10 are of such size and in such number as to permit the rising tide water to flow freely into the reservoir 12 without setting up unnecessary currents therein, or providing unequal pressures on the wall. These openings are guarded by the valves or gates 14, which, preferably, are balanced and operated simultaneously by a horizontal shaft 42 carrying worms 43, each worm engaging a worm segment 44 fixed on a bearing pin of a valve or gate 13. When the shaft 42 is operated manually or by power the gates 13 are opened or closed, as desired.

With a plant constructed as described, and during the period of rising tide the gates or valves 14 are opened, and the ocean water flows through the inlets 13 into the reservoir. At the same time, the float 16 is lifted in the well by the tide, the movement causing the gear wheel 30 to slide vertically on the pinion 32, remaining in engagement therewith throughout its entire movement. When the tide has reached its flood, the gates are closed, and, during the ebb tide while the float is descending in the well, the gate valves 36 of the pipe or pipes 35 leading to the turbine motor 21 are opened to the stored water in the reservoir 12, which flowing to the turbine drives said motor.

I claim:—

1. A system for developing power by tidal movement, comprising a reservoir into which water flows with the rising tide, means for retaining the water therein during ebb tide, a float-supported fluid motor exterior of said reservoir and adapted to rise and fall with the tide, and flexible tubular means for conducting water from the reservoir to said motor, said means being fixed at one end to and in communication with the reservoir, and at the other end connected with said motor and adapted to rise and fall with the latter.

2. A system for developing power by tidal movement, comprising a reservoir into which water subject to such movement flows with the rising tide, means for retaining the water therein during ebb tide, a fixed well-like structure provided with a frame-work situated in the tidal water and open thereto, a float adapted to move in upward and downward directions by the rising and falling tide, a fluid motor supported on said float and movable therewith, flexible tubular means for conducting water from the reservoir to said motor, gearing also carried by the float and operated by said motor, and power-distributing gearing supported by the well frame-work, including an elongated vertically arranged pinion in continuous engagement with the gearing on the float, whatever be the position of the latter.

3. A system for developing power by tidal movement, comprising a reservoir into which water subject to such movement flows with the rising tide, means for retaining the water therein during ebb tide, a fixed well-like structure situated in the tidal water and having a bottom aperture open to said water, a float movable in upward and downward directions by the rising and falling tide, a fluid motor supported on said float and movable therewith, flexible tubular means for conducting water from the reservoir to the motor, gearing movable with the float and operated by said motor, a pinion for engagement with such gearing and in fixed bearings supported by the well-like structure, said pinion having a length equal to the vertical movement of the float, whereby to maintain constant engagement with said gearing, and means driven through the rotation of said pinion for utilizing the power developed.

In testimony whereof I affix my signature.

VINCENZO PAESANO.